US012782898B2

(12) United States Patent
Nallaperumal et al.

(10) Patent No.: US 12,782,898 B2
(45) Date of Patent: Nov. 3, 2026

(54) CONTROLLING ON-DEMAND USER ACCESS TO SMART ALERTS

(71) Applicant: Kiddie Fire Protection, LLC, Bradenton, FL (US)

(72) Inventors: Pirammanayagam Nallaperumal, Hyderabad (IN); Saikrishna Gajula, Hyderabad (IN); Ramakrishna Pulluru, Hyderabad (IN); Rizwana Begum, Hyderabad (IN); Ramesh Lingala, Hyderabad (IN); Nikhil Bollampally, Hyderabad (IN)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 547 days.

(21) Appl. No.: 18/315,110

(22) Filed: May 10, 2023

(65) Prior Publication Data

US 2023/0367279 A1 Nov. 16, 2023

Related U.S. Application Data

(60) Provisional application No. 63/342,334, filed on May 16, 2022.

(51) Int. Cl.
*G05B 19/042* (2006.01)
*G08B 25/04* (2006.01)

(52) U.S. Cl.
CPC .. *G05B 19/042* (2013.01); *G05B 2219/25011* (2013.01)

(58) Field of Classification Search
None
See application file for complete search history.

(56) References Cited

U.S. PATENT DOCUMENTS 8,378,808 B1 * 2/2013 Gwaltney .............. G08B 25/14 340/691.3
10,540,835 B2 * 1/2020 Kuenzi .............. G07C 9/00571
10,803,720 B2 * 10/2020 Bucsa ...................... H04L 67/12
(Continued)

FOREIGN PATENT DOCUMENTS

WO 2015157305 A1 10/2015

OTHER PUBLICATIONS

European Application No. 23173468.2 filed May 15, 2023; Extended European Search Report dated Oct. 12, 2023; 8 pages.

*Primary Examiner* — Ariel Mercado-Vargas
(74) *Attorney, Agent, or Firm* — CANTOR COLBURN LLP

(57) ABSTRACT

An access controller of a communications network includes a processor operable to send a smart-device access request to a network server of the communications network. The processor is further operable to receive a smart-device access advertisement based at least in part on: the network server receiving the smart-device access request; and a determination by the network server that the processor is within an access area. The processor is further operable to use the smart-device access advertisement to establish access between the processor and a smart-device of the communications network. Subsequent to establishing the access between the processor and the smart-device, the processor is operable to communicate with the smart-device whether or not the processor is within the access area.

20 Claims, 5 Drawing Sheets

(56) References Cited

U.S. PATENT DOCUMENTS

| | | | | |
|---|---|---|---|---|
| 2012/0190325 | A1* | 7/2012 | Abu-Hakima | H04L 12/1895 455/404.2 |
| 2014/0361891 | A1* | 12/2014 | Halverson | G08B 25/10 340/539.12 |
| 2015/0279184 | A1* | 10/2015 | Kore | G08B 25/009 340/539.13 |
| 2016/0381537 | A1* | 12/2016 | R | H04W 4/021 455/404.1 |
| 2019/0197855 | A1 | 6/2019 | Lingala et al. | |
| 2020/0135005 | A1* | 4/2020 | Katz | H04M 7/0021 |
| 2020/0145781 | A1* | 5/2020 | Kuenzi | H04W 4/021 |
| 2021/0314757 | A1* | 10/2021 | Pellegrini | G08B 25/10 |
| 2022/0070014 | A1 | 3/2022 | Schwartz et al. | |
| 2022/0335799 | A1* | 10/2022 | P | G08B 17/00 |

* cited by examiner

CONTROLLING ON-DEMAND USER ACCESS TO SMART ALERTS

CROSS-REFERENCE TO RELATED APPLICATIONS

This application claims the benefit of U.S. Provisional Application No. 63/342,334 filed May 16, 2022, the disclosure of which is incorporated herein by reference in its entirety.

BACKGROUND

Exemplary embodiments of the present disclosure relate in general to programmable computers, and more particularly to computer systems and computer-implemented methods operable to control on-demand user access to smart alerts generated by a building-safety control system.

Data communication networks transmit digital data from one computer to another computer using a variety of communications channels and protocols. The physical connections between networked computing devices are established using cable media and/or wireless media. The best-known data communication network is actually a network of networks called an internetwork, or simply the Internet. The Internet is the world's largest network and uses a transmission control protocol/internet protocol (TCP/IP) as its protocol suite, along with using IP as its addressing protocol.

Computers or processors can utilize a data communications network to communicate with or otherwise control other devices or systems on the communications network. For example, so-called building-safety control systems have been developed to facilitate the protection and/or evacuation of a building's population in emergencies, including fires and earthquakes, as well as less critical events such as power failures. A known building-safety system configuration can include a processor-based controller coupled through a communications network to a variety of smart devices or smart systems of a building, a home, or selected rooms within a building or a home.

For buildings such as rental properties, hotels or office buildings, it can be useful to provide certain users (e.g., hotel guests, short-term renters) with a temporary and controllable way to receive alerts from the relevant building-safety control system. Known methods of providing users with temporary access to alerts from a building-safety control system require interaction between the user and a representative of the building's owner or manager, as well as the exchange of user information (e.g., the user's email address) between the user and a representative of the building's owner or manager.

It would be beneficial to provide a computer system and/or a computer-implemented method that provides users with temporary access to alerts from a building-safety control system without requiring interaction between the user and a representative of the building's owner or manager, and without requiring the exchange of user information (e.g., the user's email address) between the user and a representative of the building's owner or manager.

BRIEF DESCRIPTION

According to an embodiment, an access controller of a communications network includes a processor operable to send a smart-device access request to a network server of the communications network. The processor is further operable to receive a smart-device access advertisement based at least in part on: the network server receiving the smart-device access request; and a determination by the network server that the processor is within an access area. The processor is further operable to use the smart-device access advertisement to establish access between the processor and a smart-device of the communications network. Subsequent to establishing the access between the processor and the smart-device, the processor is operable to communicate with the smart-device whether or not the processor is within the access area.

In addition to one or more of the features described above, or as an alternative to any of the foregoing embodiments, the determination by the network server that the processor is within the access area is based at least in part on a determination that the smart-device is registered with the network server.

In addition to one or more of the features described above, or as an alternative to any of the foregoing embodiments, the determination by the network server that the processor is within the access area is based at least in part on the processor providing the network server with information of a router that is within the access area.

In addition to one or more of the features described above, or as an alternative to any of the foregoing embodiments, the smart-device communicates with the network server through the router.

In addition to one or more of the features described above, or as an alternative to any of the foregoing embodiments, the smart-device includes a smoke detector; the processor is housed in mobile smartphone; and subsequent to establishing the access between the processor and the smoke detector, the processor receives alerts from the smoke detector.

In addition to one or more of the features described above, or as an alternative to any of the foregoing embodiments, the smart-device includes an indoor air quality detector; the processor is housed in mobile smartphone; and subsequent to establishing the access between the processor and the indoor air quality detector, the processor receives alerts from the indoor air quality detector.

In addition to one or more of the features described above, or as an alternative to any of the foregoing embodiments, the smart-device access advertisement is capable of establishing access between the processor and an additional smart-device of the communications network.

In addition to one or more of the features described above, or as an alternative to any of the foregoing embodiments, the access between the processor and the additional smart-device of the communications network requires that the network server receives additional authorization.

In addition to one or more of the features described above, or as an alternative to any of the foregoing embodiments, the network server includes a cloud server.

In addition to one or more of the features described above, or as an alternative to any of the foregoing embodiments, the processor is incorporated within a mobile smartphone; the network server includes a cloud server; the smart-device includes a smoke detector or an indoor air quality detector; and the access area includes a building or a predetermined region within the building.

According to another embodiment, a computer-implemented method of operating an access controller of a communications network, where the method includes using a processor to send a smart-device access request to a network server of the communications network. The processor is further used to receive a smart-device access advertisement based at least in part on: the network server receiving the smart-device access request; and a determination by the network server that the processor is within an access area. The processor further uses the smart-device access advertisement to establish access between the processor and a smart-device of the communications network. Subsequent to establishing the access between the processor and the smart-device, the processor communicates with the smart-device whether or not the processor is within the access area.

In addition to one or more of the features described above, or as an alternative to any of the foregoing embodiments, the determination by the network server that the processor is within the access area is based at least in part on a determination that the smart-device is registered with the network server.

In addition to one or more of the features described above, or as an alternative to any of the foregoing embodiments, the determination by the network server that the processor is within the access area is based at least in part on the processor providing the network server with information of a router that is within the access area.

In addition to one or more of the features described above, or as an alternative to any of the foregoing embodiments, the smart-device communicates with the network server through the router.

In addition to one or more of the features described above, or as an alternative to any of the foregoing embodiments, the smart-device includes a smoke detector; the processor is housed in mobile smartphone; and subsequent to establishing the access between the processor and the smoke detector, the processor receives alerts from the smoke detector.

In addition to one or more of the features described above, or as an alternative to any of the foregoing embodiments, the smart-device includes an indoor air quality detector; the processor is housed in mobile smartphone; and subsequent to establishing the access between the processor and the indoor air quality detector, the processor receives alerts from the indoor air quality detector.

In addition to one or more of the features described above, or as an alternative to any of the foregoing embodiments, the smart-device access advertisement is capable of establishing access between the processor and an additional smart-device of the communications network.

In addition to one or more of the features described above, or as an alternative to any of the foregoing embodiments, the access between the processor and the additional smart-device of the communications network requires that the network server receives additional authorization.

In addition to one or more of the features described above, or as an alternative to any of the foregoing embodiments, the network server includes a cloud server.

In addition to one or more of the features described above, or as an alternative to any of the foregoing embodiments, the communications network includes a building-safety control (BSC) system; the processor is incorporated within a mobile smartphone; the network server includes a cloud server; the smart-device includes a smoke detector or an indoor air quality detector; and the access area includes a building or a predetermined region within the building.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed systems and methods are presented herein by way of exemplification and not limitation with reference to the Figures.

Embodiments of the present disclosure provide computer systems and computer-implemented methods operable to control on-demand user access to smart alerts generated by a building-safety control system. In embodiments of the disclosure, the on-demand user access is operable to provide a user with access to the smart alerts of an access area by confirming that the user is likely in the access area before providing the user with access to the alerts.

Figure 1:
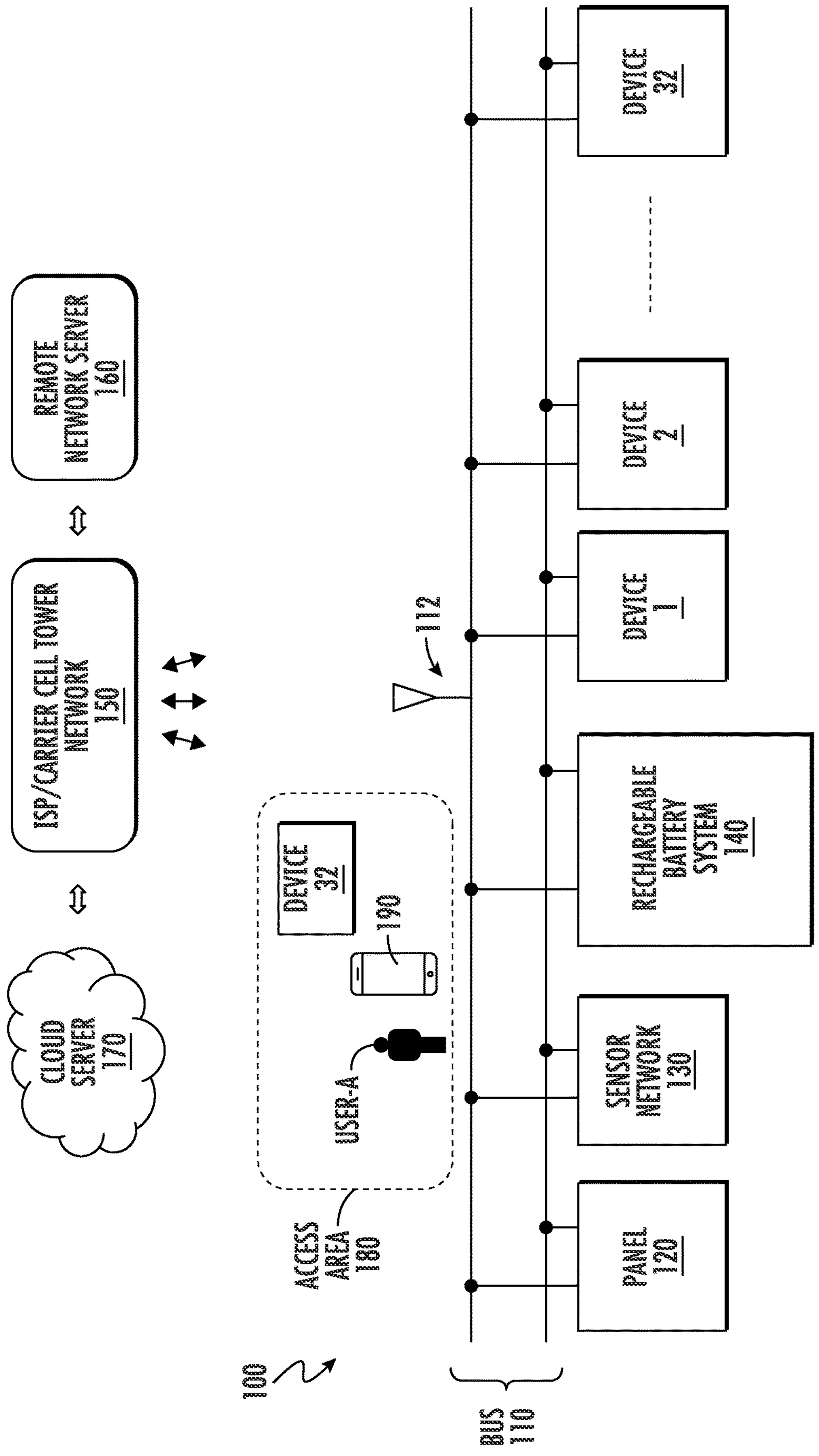
FIG. 1 is a block diagram of a building-safety control system operable to implement an on-demand user access process according to an embodiment.

With reference now to FIG. 1, embodiments of the disclosure can be applied to a variety of communications networks, including but not limited to a building-safety control (BSC) system 100. The BSC system 100 is operable to control on-demand user access to smart alerts generated by the BSC system 100 according to embodiments. The BSC system 100 is depicted in FIG. 1 as a simplified diagram illustrating a processor-based control host 120, a smart sensor network 130, a rechargeable battery system 140, and multiple connected smart devices 1-32 in communication over a bus 110. An antenna system 112 places the bus 110 in communication with an ISP/carrier cell tower network 150, a remote network sever 160, and a cloud server system 170, configured and arranged as shown. In embodiments of the disclosure, the smart device 32 is located in an access area 180. User-A is also depicted in access area 180. User-A is in possession of his/her smartphone 190.

In embodiments of the disclosure, the sensor network 130 can include, for example, electronic heat and smoke sensors; the rechargeable battery system can include a plurality of battery units/sets; and the smart devices 1-32 can include, for example, processor-controlled safety devices (e.g., sprinkler systems, smoke alarms, and the like) and processor-controlled general building systems (e.g., ventilating systems, elevator systems, and the like). The BSC system 100 is operable to monitor the smart sensor network 130; detect a potential building emergency based on the smart sensor network 130; and initiate a variety of responses to the detected building emergency, including, for example, activating audible alarms, automatically notifying local fire departments, activating building sprinkler systems, shutting down ventilating systems, shutting down elevators, and the like.

The various processor-based operations of the BSC system 100 described herein can be allocated in any manner among the devices and systems that make up the BSC system 100. For example, the cloud server 170 is in wired or wireless electronic communication with one or all of remote network server 160, cell tower network 150, antenna system 112, the bus 110, the host 120, the sensor network 130, the rechargeable battery system 140, and devices 1-32. Cloud server 170 can supplement, support, or replace some or all of the functionality of remote network server 160, cell tower network 150, antenna system 112, the bus 110, the host 120, the sensor network 130, the rechargeable battery system 140, and devices 1-32. Additionally, some or all of the functionality of remote network server 160, cell tower network 150, antenna system 112, the bus 110, the host 120, the sensor network 130, the rechargeable battery system 140, and devices 1-32 can be implemented as a node of the cloud server 170.

Figure 2:
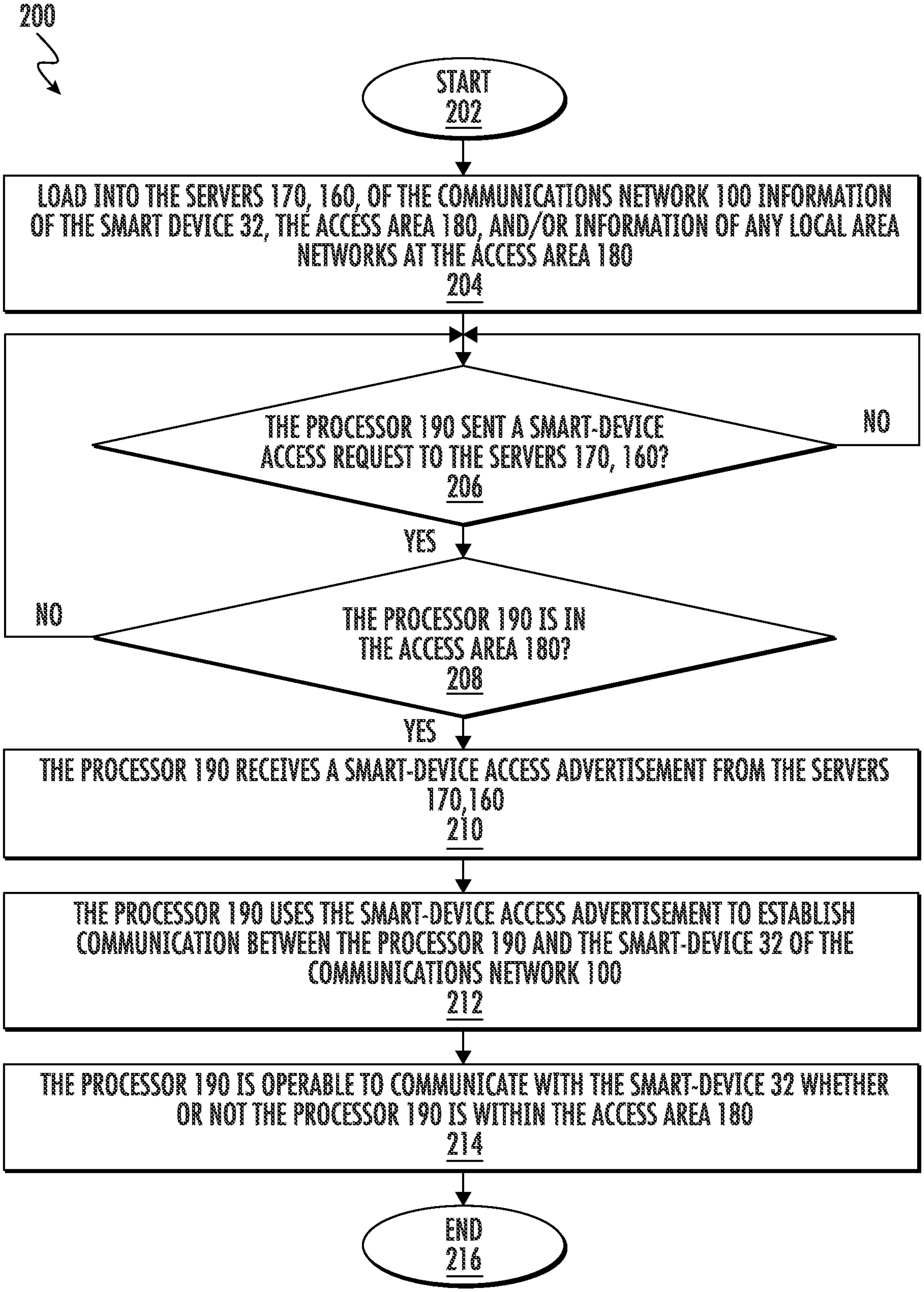
FIG. 2 is a flow diagram illustrating aspects of an on-demand user access process according to an embodiment.

FIG. 2 is a flow diagram illustrating a methodology 200 in accordance with embodiments. The methodology 200 is implemented by a network protocol of the BSC system 100 to control on-demand user access to smart alerts generated by the BSC system 100. As with other network protocols, the network protocol of the BSC system 100 is a set of established rules that dictate how to format, transmit and receive data so that computer network devices—from servers and routers to endpoints—can communicate, regardless of the differences in their underlying infrastructures, designs or standards. To successfully send and receive information, devices on both sides of a communication exchange must accept and follow protocol conventions. The network protocols of the BSC system 100 can be built into software, hardware or both at any component of the BSC system 100.

The methodology 200 begins at block 202 then moves to block 204 where the servers 170, 160 are loaded with identifying information of the device 32, the access area 180, a router 302 (shown in FIG. 3), and or any local area networks of the access area 180. The identifying information, in effect, registers the access area 180 as an area where on-demand user access to smart alerts generated by the BSC system 100 will be implemented.

From block 204, the methodology 200 moves to decision block 206 and determines whether or not a processor of the smartphone 190 (hereinafter, processor 190) sent a smart-device access request to the servers 170, 160. If the answer to the inquiry at decision block 206 is no, the methodology 200 returns to the input to decision block 206 to continue evaluating whether the processor 190 has sent a smart-device access request to the servers 170, 160. If the answer to the inquiry at decision block 206 is yes, the methodology 200 moves to decision block 208 to determine whether the processor 190 is in the access area 180. Any suitable method can be used to make the determination at decision block 208. In some embodiments, the determination at decision block 208 is made by determining whether or not the processor 190 is communicating through the router 308. In some embodiments, the determination is made based on the processor 190 providing the servers 170, 160 with some or all of the identifying information that was used to register the access area 180 as an area where on-demand user access to smart alerts generated by the BSC system 100 will be implemented. If the answer to the inquiry at decision block 208 is no, the methodology 200 returns to the input to decision block 206 to continue evaluating whether the processor 190 has sent a smart-device access request to the servers 170, 160. If the answer to the inquiry at decision block 208 is yes, the methodology 200 moves to block 210 where the servers 170, 160 either transmits or authorizes the transmission of (e.g., through the smart device 32) a smart-device access advertisement to the processor 190. In some embodiments, the smart-device access advertisement can be implemented as a Bluetooth low energy (BLE) advertisement that defines two transmissions types, namely data and advertising transmissions. All peripheral devices, at least initially, begin in advertising mode. Advertising allows devices to broadcast information defining their intentions. In embodiments, the smart-device access advertisement broadcasts its intention to provide the processor 190 with access to the smart device 32, along with instructions on how to initiate that access.

At block 212, the processor 190 uses the smart-device access advertisement to establish communication between the processor 190 and the smart-device 32 that is within the access area 180. At block 214, once the communications authorized at block 212 have been established, the processor 190 is operable to communicate with the smart-device 32 whether or not the processor 190 is within the access area 180. The methodology 200 ends at block 216.

Figure 3:
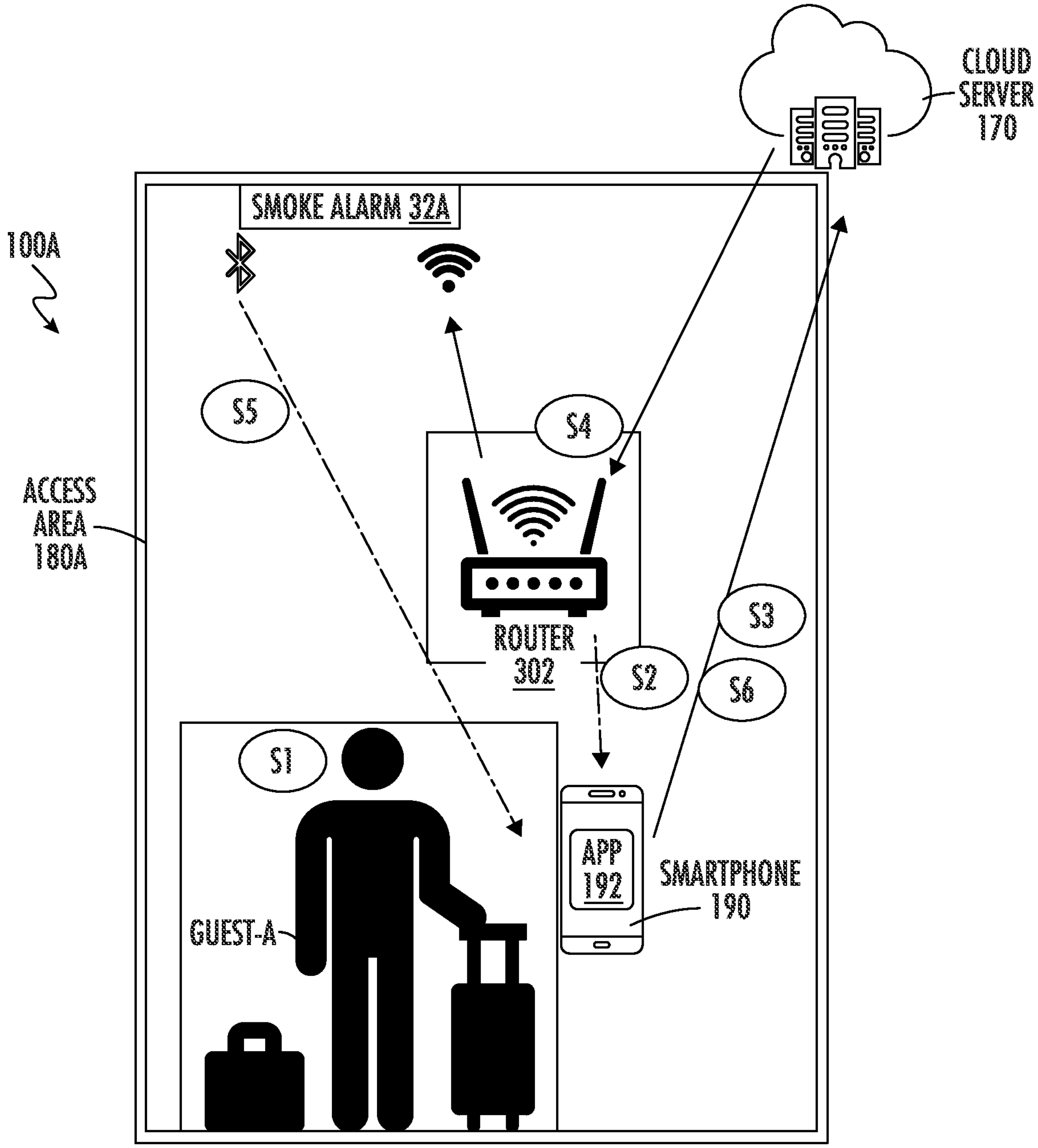
FIG. 3 is a block diagram of a building-safety control system operable to implement an on-demand user access process according to an embodiment.

FIG. 3 is a simplified block diagram illustrating a BSC system 100A according to embodiments. The BSC system 100A is identical to the BSC system 100 (shown in FIG. 1) except the BSC system 100A shows only a portion of the BSC system 100, and the BSC system 100A includes an access area 180A, which is a more detailed illustration of how the access area 180 (shown in FIG. 1) can be implemented. The access area 180A represents an area or room of a building. For example, the access area 180A can be a room in a hotel where the BSC system 100, 100A is installed. The access area 180A includes a router 302 that provides a local Wi-Fi network in the access area 180A, and couples the local Wi-Fi network to the external network (including the internet) represented by the cloud server 170. A smart device in the form of a smart smoke alarm 32A is provided in the access area 180A and is coupled through the router 302 to the cloud server 170.

Guest-A is renting the access area 180A for a week and arrives in the access area 180A with a smartphone (or processor) 190 that includes an App 192 operable to control on-demand user access to smart alerts generated by the smoke alarm 32A using the BSC system 100A. In some embodiments, the processor 190 and the App 192 can implement the methodology 200 shown in FIG. 2. In some embodiments, the processor 190 and the App 192 can implement a methodology 400, which is represented by Step 1 (S1) through Step 6 (S6) shown in FIG. 3 and FIG. 4.

Figure 4:
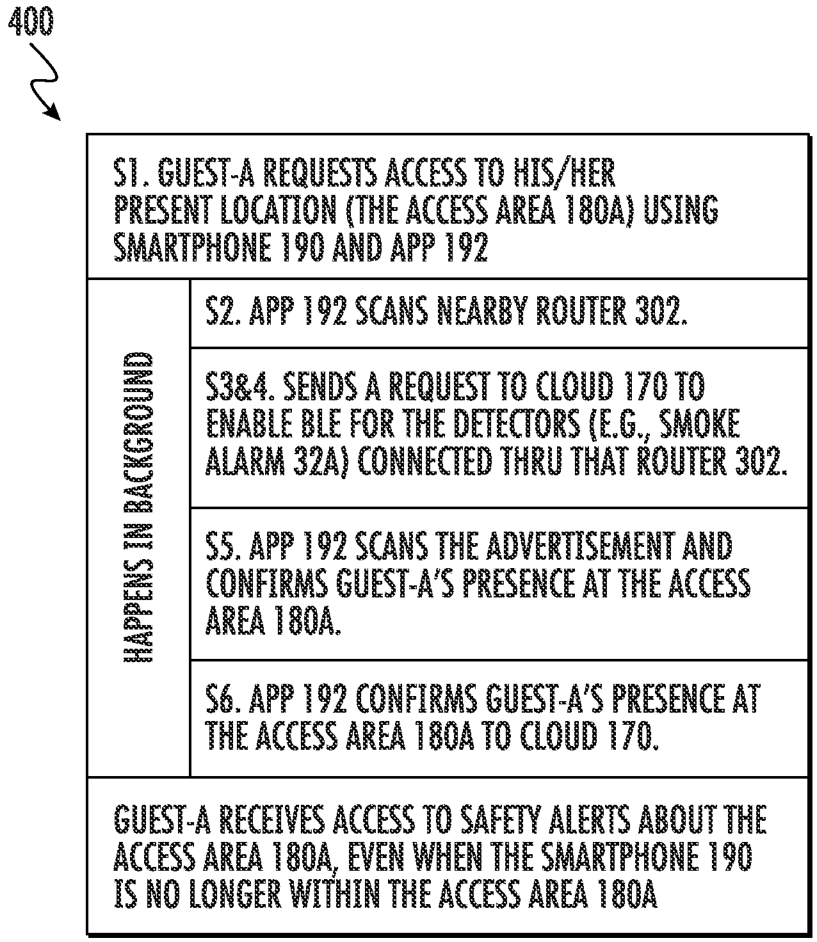
FIG. 4 is a flow diagram illustrating aspects of an on-demand user access process according to an embodiment.

The methodology 400 will now be described with reference to S1 through S6 shown in FIG. 3 and FIG. 4. Prior to the arrival of Guest-A at the access area 180A, identifying information of the smoke alarm 32A, the router 302, and the location and name of the access area 180A are registered with the BSC system 100, 100A, and the BSC system 100, 100A is operable to identify the access area 180A as an area where on-demand Guest-A access to smart alerts generated by the smoke detector 32A through the BCS system 100, 100A will be provided to any processor (e.g., smartphone/processor 190) that is present in the access area 180A and requests access to alerts from the smoke alarm 32A through the App 192.

At S1, Guest-A uses the smartphone/processor 190 and the App 192 to request access to alerts at the access area 180A. At S2, the processor 190 and App 192 scans the router 302 (with or without connecting to it) and extracts identifying information (e.g., SSID (service set identifier), MAC address (media access control address), and the like) of the router 302. At S3, the processor 190 and App 192 send a request to the cloud server 170 for it to enable BLE advertisements from the smoke detector 32A that the cloud server 170 knows is associated with the router 302 and is at the access area 180A. At S4, the cloud server 170 validates the request received at S3, and sends a request through the router 302 to the smoke detector 32A to enable and/or initiate the transmission of BLE advertisements from the smoke detector 32A. In some embodiments, the BLE advertisements are transmitted by the cloud server 170. At S5, the processor 190 and the App 192 scan the BLE advertisement and confirms Guest-A's presence at the Access Area 180A. At S6, the processor 190 and the App 192 confirm Guest-A's presence at the Access Area 180A to the cloud server 170. After S6, the smartphone 190 and the App 192 receive access to safety alerts from the smoke detector 32A even when the smartphone 190 is no longer within the access area 180A.

In embodiments, various limits can be placed on the access provided through the BLE advertisement generated by S1-S6. For example, in some embodiments, the access provided through the BLE advertisement can be operable to automatically expire after a predetermined time that corresponds to the duration of Guest-A's stay at the access area 180A. In some embodiments, the access provided through the BLE advertisement can be limited to selected basic types of the smart devices 1-32, and access to more sophisticated types of the smart devices 1-32 can require additional authorization (e.g., building owner authorization), Guest-A authentication information, Guest-A status information (e.g., Guest-A is in a preferred customer program), and the like.

Figure 5:
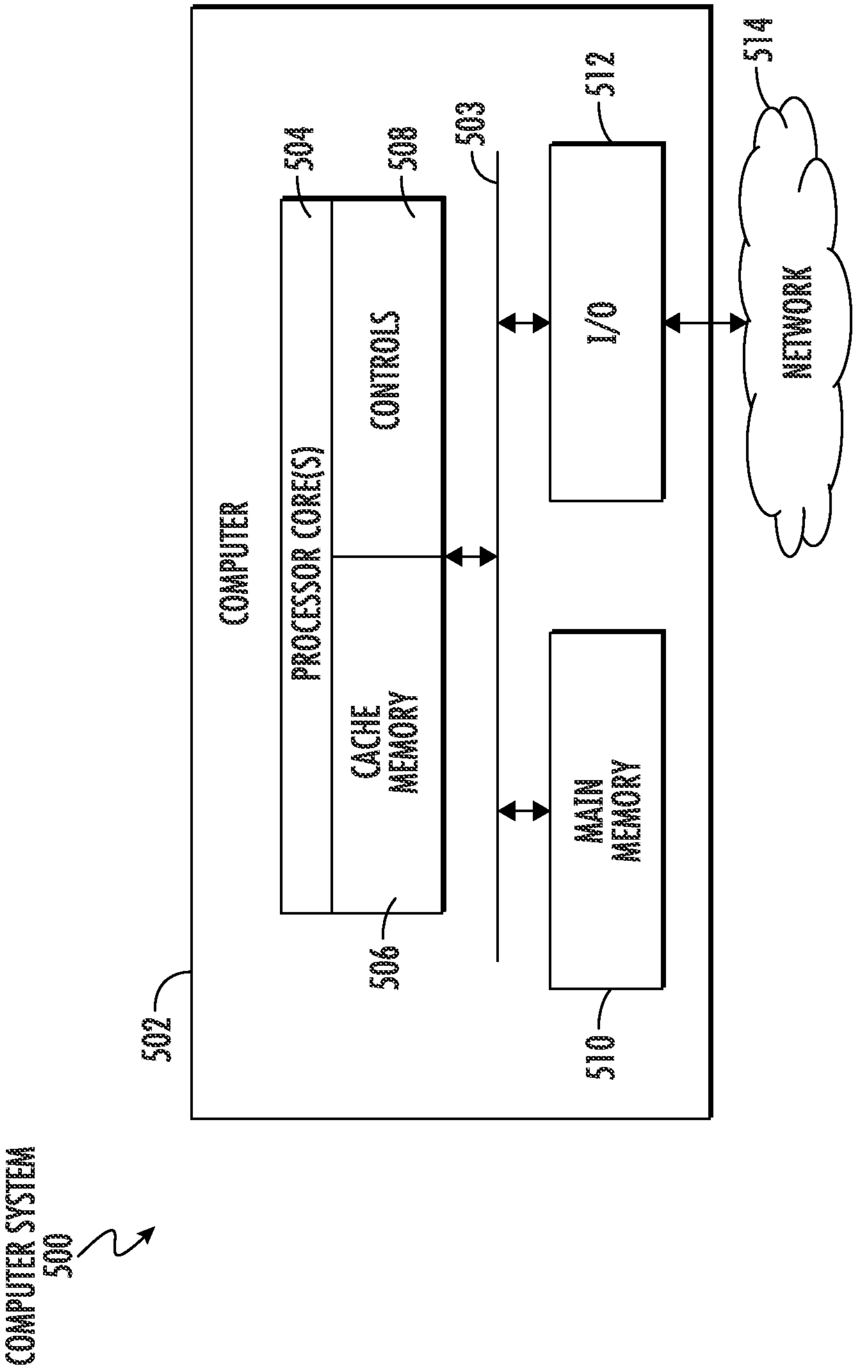
FIG. 5 is a block diagram of a programmable computer system operable to implement aspects of an on-demand user access process according to an embodiment.

FIG. 5 illustrates an example of a computer system 500 that can be used to implement the aspects of the disclosure described herein. The computer system 500 includes an exemplary computing device ("computer") 502 configured for performing various aspects of the content-based semantic monitoring operations described herein in accordance embodiments of the disclosure. In addition to computer 502, exemplary computer system 500 includes network 514, which connects computer 502 to additional systems (not depicted) and can include one or more wide area networks (WANs) and/or local area networks (LANs) such as the Internet, intranet(s), and/or wireless communication network(s). Computer 502 and additional system are in communication via network 514, e.g., to communicate data between them.

Exemplary computer 502 includes processor cores 504, main memory ("memory") 510, and input/output component(s) 512, which are in communication via bus 503. Processor cores 504 includes cache memory ("cache") 506 and controls 508, which include branch prediction structures and associated search, hit, detect and update logic, which will be described in more detail below. Cache 506 can include multiple cache levels (not depicted) that are on or off-chip from processor 504. Memory 510 can include various data stored therein, e.g., instructions, software, routines, etc., which, e.g., can be transferred to/from cache 506 by controls 508 for execution by processor 504. Input/output component(s) 512 can include one or more components that facilitate local and/or remote input/output operations to/from computer 502, such as a display, keyboard, modem, network adapter, etc. (not depicted).

Embodiments of the disclosure described herein can be a system, a method, and/or a computer program product at any possible technical detail level of integration. The computer program product may include a computer readable storage medium (or media) having computer readable program instructions thereon for causing a controller or processor to carry out aspects of the embodiments of the disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

For the sake of brevity, conventional techniques related to making and using the disclosed embodiments may or may not be described in detail herein. In particular, various aspects of computing systems and specific computer programs to implement the various technical features described herein are well known. Accordingly, in the interest of brevity, many conventional implementation details are only mentioned briefly or are omitted entirely without providing the well-known system and/or process details.

Many of the function units of the systems described in this specification have been labeled or described as modules. Embodiments of the disclosure apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module.

The various components, modules, sub-function, and the like of the systems illustrated herein are depicted separately for ease of illustration and explanation. In embodiments of the disclosure, the operations performed by the various components, modules, sub-functions, and the like can be distributed differently than shown without departing from the scope of the various embodiments described herein unless it is specifically stated otherwise.

For convenience, some of the technical operations described herein are conveyed using informal expressions. For example, a processor that has data stored in its cache memory can be described as the processor "knowing" the data. Similarly, a user sending a load-data command to a processor can be described as the user "telling" the processor to load data. It is understood that any such informal expressions in this detailed description should be read to cover, and a person skilled in the relevant art would understand such informal expressions to cover, the formal and technical description represented by the informal expression.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An access controller of a communications network, the access controller comprising a processor configured to:

send a smart-device access request to a network server of the communications network;

receive a smart-device access advertisement based at least in part on the network server:

receiving the smart-device access request;

initiating a presence analysis configured to evaluate whether or not the processor is present within an access area;

responsive to a result of the presence analysis, making a determination that the processor is present within the access area; and responsive to the determination that the processor is present within an access area, transmitting or authorizing a transmission of the smart-device access advertisement;

use the smart-device access advertisement to establish access between the processor and a smart-device of the communications network; and subsequent to establishing the access between the processor and the smart-device, communicate with the smart-device whether or not the processor is present within the access area.

2. The access controller of claim 1, wherein the determination by the network server that the processor is present within the access area is based at least in part on a determination that the smart-device is registered with the network server.

3. The access controller of claim 1, wherein the determination by the network server that the processor is present within the access area is based at least in part on the processor providing the network server with information of a router that is within the access area, and on a determination that the processor is communicating through the router.

4. The access controller of claim 3, wherein the smart-device communicates with the network server through the router.

5. The access controller of claim 1, wherein:

the smart-device comprises a smoke detector;

the processor is housed in a mobile smartphone; and subsequent to establishing the access between the processor and the smoke detector, the processor receives alerts from the smoke detector.

6. The access controller of claim 1, wherein:

the smart-device comprises an indoor air quality detector;

the processor is housed in mobile smartphone; and subsequent to establishing the access between the processor and the indoor air quality detector, the processor receives alerts from the indoor air quality detector.

7. The access controller of claim 1, wherein the smart-device access advertisement is configured to be used by the processor to establish access between the processor and an additional smart-device of the communications network.

8. The access controller of claim 7, wherein the access between the processor and the additional smart-device of the communications network requires that the network server receives additional authorization.

9. The access controller of claim 1, wherein the network server comprises a cloud server.

10. The access controller of claim 1, wherein:

the communications network includes a building-safety control (BSC) system;

the processor is incorporated within a mobile smartphone;

the network server comprises a cloud server;

the smart-device comprises a smoke detector or an indoor air quality detector; and the access area comprises a building or a predetermined region within the building.

11. A computer-implemented method of operating an access controller of a communications network, the access controller comprising a processor, the method comprising using the processor to:

send a smart-device access request to a network server of the communications network;

receive a smart-device access advertisement based at least in part on the network server:

receiving the smart-device access request;

initiating a presence analysis configured to evaluate whether or not the processor is present within the access area;

responsive to a result of the presence analysis, making a determination that the processor is present within the access area; and responsive to the determination that the processor is present within an access area, transmitting or authorizing a transmission of the smart-device access advertisement;

use the smart-device access advertisement to establish access between the processor and a smart-device of the communications network; and subsequent to establishing the access between the processor and the smart-device, communicate with the smart-device whether or not the processor is present within the access area.

12. The method of claim 11, wherein the determination by the network server that the processor is present within the access area is based at least in part on a determination that the smart-device is registered with the network server.

13. The method of claim 11, wherein the determination by the network server that the processor is present within the access area is based at least in part on the processor providing the network server with information of a router that is within the access area, and on a determination that the processor is communicating through the router.

14. The method of claim 13, wherein the smart-device communicates with the network server through the router.

15. The method of claim 11, wherein:

the smart-device comprises a smoke detector;

the processor is housed in a mobile smartphone; and subsequent to establishing the access between the processor and the smoke detector, the processor receives alerts from the smoke detector.

16. The method of claim 11, wherein:

the smart-device comprises an indoor air quality detector;

the processor is housed in mobile smartphone; and subsequent to establishing the access between the processor and the indoor air quality detector, the processor receives alerts from the indoor air quality detector.

17. The method of claim 11, wherein the smart-device access advertisement is configured to be used by the processor to establish access between the processor and an additional smart-device of the communications network.

18. The method of claim 17, wherein the access between the processor and the additional smart-device of the communications network requires that the network server receives additional authorization.

19. The method of claim 11, wherein the network server comprises a cloud server.

20. The method of claim 11, wherein:

the communications network includes a building-safety control (BSC) system;

the processor is incorporated within a mobile smartphone;

the network server comprises a cloud server;

the smart-device comprises a smoke detector or an indoor air quality detector; and the access area comprises a building or a predetermined region within the building.

* * * * *